(12) United States Patent
Antonelli et al.

(10) Patent No.: US 9,824,210 B2
(45) Date of Patent: Nov. 21, 2017

(54) METHOD FOR MEASURING AND MONITORING THE ACCESS LEVELS TO PERSONAL DATA GENERATED BY RESOURCES OF A USER DEVICE

(71) Applicant: Telecom Italia S.p.A., Milan (IT)

(72) Inventors: Fabrizio Antonelli, Povo (IT); Andrea Cappellotto, Sarcedo (IT); Michele Caraviello, Povo (IT)

(73) Assignee: Telecom Italia S.p.A., Milan (IT)

( * ) Notice: Subject to any disclaimer, the term of this patent is extended or adjusted under 35 U.S.C. 154(b) by 41 days.

(21) Appl. No.: 14/772,736

(22) PCT Filed: Mar. 3, 2014

(86) PCT No.: PCT/EP2014/054039
§ 371 (c)(1),
(2) Date: Sep. 3, 2015

(87) PCT Pub. No.: WO2014/135485
PCT Pub. Date: Sep. 12, 2014

(65) Prior Publication Data
US 2016/0012221 A1    Jan. 14, 2016

(30) Foreign Application Priority Data
Mar. 5, 2013  (IT) .............................. MI2013A0325

(51) Int. Cl.
*G06F 21/60* (2013.01)
*G06F 21/55* (2013.01)
(Continued)

(52) U.S. Cl.
CPC .............. *G06F 21/55* (2013.01); *G06F 21/50* (2013.01); *G06F 21/604* (2013.01);
(Continued)

(58) Field of Classification Search
CPC .............. G06F 21/6245; G06F 21/604; G06F 2212/1032; H04W 12/02
See application file for complete search history.

(56) References Cited

U.S. PATENT DOCUMENTS 8,677,448 B1 * 3/2014 Kauffman ......... G06F 17/30082
726/1
2007/0094281 A1 * 4/2007 Malloy .................. G06Q 10/06
(Continued)

FOREIGN PATENT DOCUMENTS

WO    2012/109512 A1    8/2012

OTHER PUBLICATIONS

Wang et al., "Quantitative Security Risk Assessment of Android Permissions and Applications", 2013, pp. 226-241.*
(Continued)

*Primary Examiner* — Thaddeus Plecha
(74) *Attorney, Agent, or Firm* — Banner & Witcoff, Ltd.

(57) ABSTRACT

A method involves measuring and monitoring usage of data stored on a user device by software applications installed on the user device, the data being generated by resources of the user device. The method includes for each resource, assigning a resource sensitivity value, the resource sensitivity values of different resources being adapted to enable discrimination among resources based on sensitivity of the data they generate; for each application, calculating a respective application access level to the data by combining through a first predetermined function the resource sensitivity values of the resources that generate data accessed by the application; calculating a device access level to the data by the applications, the device access level being calculated by combining through a second predetermined function the calculated application access levels of the applications installed on the device; and associating with each applica-
(Continued)

tion a respective indication of the calculated device access level.

20 Claims, 3 Drawing Sheets

(51) Int. Cl.
*G06F 21/62* (2013.01)
*H04W 12/02* (2009.01)
*G06F 21/50* (2013.01)
*H04L 29/06* (2006.01)

(52) U.S. Cl.
CPC ........ *G06F 21/6245* (2013.01); *H04W 12/02* (2013.01); *G06F 2212/1032* (2013.01); *H04L 63/105* (2013.01)

(56) References Cited

U.S. PATENT DOCUMENTS

| | | | |
|---|---|---|---|
| 2010/0257577 A1 | 10/2010 | Grandison et al. | |
| 2012/0072991 A1* | 3/2012 | Belani | H04W 4/001 726/25 |
| 2013/0055387 A1* | 2/2013 | Kim | G06F 21/55 726/22 |
| 2013/0212684 A1* | 8/2013 | Li | G06F 17/30522 726/25 |
| 2013/0318614 A1* | 11/2013 | Archer | G06F 21/577 726/25 |
| 2013/0340086 A1* | 12/2013 | Blom | G06F 21/6245 726/26 |
| 2014/0189873 A1* | 7/2014 | Elder | G06F 21/577 726/25 |

OTHER PUBLICATIONS

Adrienne Porter Felt, et al., "The Effectiveness of Application Permissions", University of California, Berkeley, USENIX Conference on Web Application Development (WebApps) 2011, pp. 75-86.
Adrienne Porter Felt, et al., "Android Permissions: User Attention, Comprehension, and Behavior", Symposium on Usable Privacy and Security (SOUPS) 2012, Jul. 11-13, 2012, Wash DC.
Jul. 24, 2014—(WO) Int'l Search Report and Written Opinion of the ISA—App PCT/EP2014/054039.
Eric Struse et al.: "PermissionWatcher: Creating User Awareness of Application Permissions in Mobile Systems", Nov. 13, 2012 (Nov. 13, 2012), Ambient Intelligence, Springer Berlin Heidelberg, Berlin, Heidelberg, pp. 65-80, XP047011126, ISBN: 978-3-642-34897-6 abstract p. 69-p. 72; figures 1,2.
William Enck, et al., "TaintDroid: An Information-Flow Tracking System for Realtime Privacy Monitoring on Smartphone", 9th USENIX Symposium on Operating Systems Design and Implementation (OSDI '10), Vancouver, BC, Canada, Oct. 4-6, 2010, pp. 393-407.

* cited by examiner

METHOD FOR MEASURING AND MONITORING THE ACCESS LEVELS TO PERSONAL DATA GENERATED BY RESOURCES OF A USER DEVICE

BACKGROUND OF THE INVENTION

Nowadays there is a great rise of devices (most of which are personal) equipped with resources that generate lots of data while sensing the surrounding environment, interacting with the user, communicating with external resources, etc.

Examples of such devices are the smartphones or tablets: presently, every smartphone or tablet has 6 to 8 physical sensors onboard (here referred as "physical resources") and almost a hundred of virtual ones ("virtual resources"). The physical resources are, for instance, the accelerometer, the GPS receiver, the NFC transmission module, etc. The virtual resources are, for instance, the personal account management software, the Bluetooth connection manager, etc. (most of the virtual resources are software). This is not only true for mobile phones since, with the advent of device-independent Operative Systems (like Android), there are kinds of devices with similar capabilities and other novel resources: it is the case of connected TVs, new generation cameras, car interactive equipment, etc.

The above mentioned devices host third-party services and applications that have access to the onboard resources of the devices: these generate an unprecedented amount of data that, since most of the devices are pervasive and personal, can be critical from a privacy point of view.

In the paper by Adrienne Porter Felt, Kate Greenwood, David Wagner, "The Effectiveness of Application Permissions", University of California, Berkeley, USENIX Conference on Web Application Development (WebApps) 2011, 956 android applications have been analyzed. The authors observed that 93% of free applications (total of 856) and 82% of paid applications (total of 100) have at least one dangerous permission. Dangerous permissions include actions that could cost the user money or leak private information. In particular, the authors show that Internet permission is heavily used, and in most applications, this permission could be used to store personal information from the users.

In the paper by W. Enck, P. Gilbert, B. Chun, L. P. Cox, J. Jung, P. McDaniel, and A. N. Sheth, "TaintDroid: An Information-Flow Tracking System for Realtime Privacy Monitoring on Smartphone", the authors analyze if and which type of personal data an application stores. They developed a kernel plugin to analyze the data sent to a server by all applications having the Internet connection permission along with other permission such as camera, location, etc. The authors found 358 free applications that required Internet connection permission along with other permissions and they analyzed 20 out of them. Among the latter, two sent Phone Information to Content Servers, seven sent Device ID to Content Servers and 15 sent Location to Advertisement Servers. Thus the authors demonstrated that a large amount of applications could send personal data for different purposes.

In the paper by Adrienne Porter Felt, Elizabeth Ha, Serge Egelman, Ariel Haney, Erika Chin, and David Wagner "Android Permissions: User Attention, Comprehension, and Behavior", the user attention and understanding during installation of applications is analyzed. Only 17% of participants paid attention to permissions during installation. Only 3% of Internet survey respondents could correctly answer all three questions of permission comprehension. This indicates that current Android permissions warnings do not help most users to make correct security decisions. During this test, only 20% of users were able to provide details about why they did not have an application installed. Moreover, the participants demonstrated very low comprehension of permissions granting during installation.

WO 2012/109512 discloses systems and methods for regulating access to resources at application run-time. A permissions application is invoked. The permissions application accesses an information store comprising a plurality of permissions. Each permission is associated with a corresponding resource in a plurality of device resources. The information store specifies which applications have permission to access which device resources. An application is executed on the device and makes a request for a resource while the application is executing. Responsive to the request, the permissions application determines whether the application has runtime access permission to use the resource. When the application has run-time access permission to use the resource, it is granted run-time access to the resource. When the application does not have run-time access permission to use the resource, it is not granted run-time access to the resource but is permitted to continue executing on the device without the requested resource.

SUMMARY OF THE INVENTION

The above overview of the state of the art shows that the issue of security of access to device resource (and to data generated by the device resources) by hosted applications has been studied.

The present invention is not primarily directed to the security issue, being directed to a method for providing the users of devices with an indication of access level to the personal data generated by the resources equipping the device.

According to an embodiment, the method of the present invention evaluates the access level to personal data by providing the user with a numerical and/or graphical indicator that is independent from the access rights enforcement and helps the user in understanding what data have been used by the hosted applications.

The management of the security policies is not the main aim of the present invention, the focus of the present invention being on the measurement of the level of access to personal data generated by an accessed resource.

According to an aspect of the present invention, a method is provided for measuring and monitoring the usage of personal data generated by the resources of a user device by software applications installed on the user device. The method may take into account how the resources available in a device are used (e.g., in terms of time and frequency), the number of resource accessed and the type of data generated by such resources.

The method comprises:

a) for each of said resources, assigning a resource sensitivity value in a predetermined sensitivity scale, the resource sensitivity values of the different resources being adapted to enable a discrimination of said resources based on the sensitivity of the data they generate;

b) for each of said applications, calculating a respective application access level to said data by combining through a first predetermined function the resource sensitivity values of the resources that generate data accessed by said application;

c) calculating a device access level to said data by said applications, wherein said device access level is calculated by combining through a second predetermined function the calculated application access levels of the applications installed on the device, and d) associating with each application a respective indication of the calculated application access level.

For each application, the respective indication of the calculated application access level is displayed on a display of the user device.

An indication of the calculated device access level to said data by said applications is displayed on the display of the user device.

The method may further comprise:

for each of said applications, comparing the respective calculated application access level with a predetermined first threshold value, and for each of said applications, presenting on the user device a first indication if the calculated application access level is below the first threshold value, or a second indication if the calculated application access level is not below the first threshold value.

The method may further comprise:

for each of said applications, comparing the respective calculated application access level with a predetermined second threshold value, higher than the first threshold value, and for each of said applications, presenting on the user device the second indication if the calculated application access level is below the second threshold value, or a third indication if the calculated application access level is not below the second threshold value.

The method may further comprise:

defining at least two distinct operating states in which any of said applications can be; and repeating steps a) to d) of claim 1 whenever any of said applications changes its operating state from one to another of said at least two operating states, or vice versa.

Said at least two operating states may comprise:

a first operating state, when an application is in execution on the user device and in a user-interactive mode;

a second operating state, when an application is in execution on the user device but not in the user-interactive mode;

a third operating state, when an application is not in execution on the user device but it is listening to at least one of said resources and can be activated when an event related to the resources listened to occurs;

a fourth operating state, when an application is not in execution and is not listening to any of said resources.

Said calculating, for each application, the respective application access level preferably comprises giving more weight, in said combining, to the sensitivity values of those resources that enable the connection and the data communication from the device to an external data network.

Giving more weight may comprise squaring the sensitivity values of those resources that enable the connection and the data communication from the device to an external data network.

Said first predetermined function may comprise one among: a product of the sensitivity values of the resources that generate data accessed by said application, a sum of the sensitivity values of the resources that generate data accessed by said application.

Said second predetermined function may comprise a product of the calculated application access levels of the applications installed on the device.

According to another aspect of the present invention, a computer program is provided comprising computer program code portions adapted to perform the method set forth above when the computer program is executed on a data processing device.

According to another aspect of the present invention, a user device is provided, comprising means configured to perform the method of the present invention.

BRIEF DESCRIPTION OF THE DRAWINGS

These and other features and advantages of the present invention will better appear by reading the following detailed description of some exemplary and non-limitative embodiments thereof, making reference to the attached drawings, wherein FIG. 1 schematically shows the elements, hosted on a user device, that are considered by the method of the present invention.

DETAILED DESCRIPTION OF EXEMPLARY EMBODIMENTS OF THE INVENTION

Figure 1:
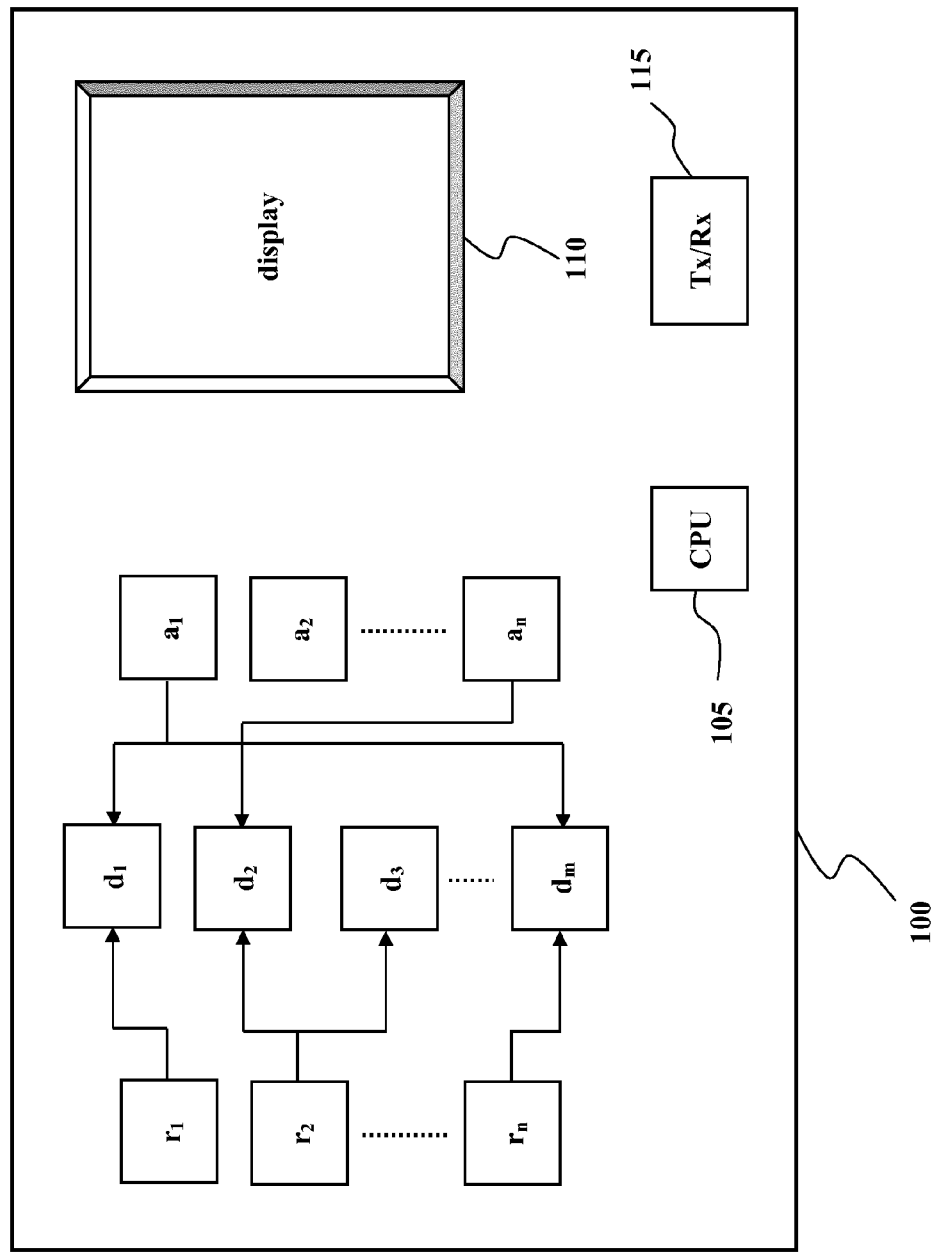

Referring to the drawings, FIG. 1 schematically shows the elements, hosted on a user device 100, that are considered by the method of the present invention. The user device 100 may for example be a smartphone or a tablet.

The device 100 comprises a processing unit (CPU) 105, a display 110, e.g. a multi-touch screen, ROM and RAM memory resources (not shown), one or more transmitter/receiver units 115 (e.g. for Wi-Fi, 2g-3g-4g cellular networks, Bluetooth, NFC).

A "Resource" $r_1, r_2, \ldots, r_n$ is intended as a physical or virtual component (physical resource or virtual resource) of the device 100, such physical or virtual component being capable of generating data $d_1, d_2, d_3, \ldots, d_m$ by, for instance, sensing the surrounding environment, interacting with the user, communicating with external resources, etc. In the case the device is a smartphone or a tablet, an example of physical resource is the accelerometer, the GPS receiver, the NFC transmission module, etc., while an example of virtual resource is the Bluetooth connection manager.

A Device Resource List $R_D$ is the list of Resources $r_1, r_2, \ldots, r_n$ available on a device D, like the device 100 [1]:

$$R_D = [r_1, r_2, \ldots, r_n]$$

Each Resource $r_i$ (i=1–n) can generate multiple data. For example, referring to FIG. 1, resource r2 generates data $d_2$ and $d_3$. The list of data generated by a generic Resource $r_i$ is called Resource Dataset $v(r_i)$, and it is defined as follows.

Given the Device Dataset DD that is the list of all possible data $d_1, d_2, d_3, \ldots, d_m$ that can be generated by the device [2]:

$$DD = \{d_1, d_2, d_3, \ldots, d_m\}$$

the Resource Dataset $v(r_i)$ of a given Resource $r_i$ is [2]:

$$v(r_i) = \{d_j \mid d_D D \wedge r_i \xrightarrow{gen} d_j\}$$

The Resource Datasets $v(r_i)$ (i=1−n) of all the Resources $r_1, r_2, \ldots, r_n$ of a device D can overlap, meaning that a given data $d_1, d_2, d_3, \ldots, d_m$ can be generated from multiple Resources $r_1, r_2, \ldots, r_n$.

The generated data $d_1, d_2, d_3, \ldots, d_m$ can be grouped in classes of generated data referred to similar types of data, e.g. POSITIONING data, COMMUNICATION data, etc. (other classes can be defined).

The table below shows how an example subset of Resources $r_1, r_2, \ldots, r_n$ can be grouped in classes (e.g. based on the similarity of the generated data $d_1, d_2, d_3, \ldots, d_m$):

TABLE 1

| | Subset of Resources | |
| --- | --- | --- |
| Class | Resource | Description |
| Positioning | ACCESS_CHECKIN_PROPERTIES | Allows read/write access to the "properties" table in the checkin database, to change values that get uploaded. |
| | ACCESS_COARSE_LOCATION | Allows an application to access approximate location derived from network location sources such as cell towers and Wi-Fi. |
| | ACCESS_FINE_LOCATION | Allows an application to access precise location from location sources such as GPS, cell towers, and Wi-Fi. |
| | ACCESS_LOCATION_EXTRA_COMMANDS | Allows an application to access extra location provider commands |
| | CONTROL_LOCATION_UPDATES | Allows enabling/disabling location update notifications from the radio link. |
| | ACCESS_MOCK_LOCATION | Allows an application to create mock location providers for testing |
| Communication | CALL_PHONE | Allows an application to initiate a phone call without going through the Dialer user interface for the user to confirm the call being placed. |
| | CALL_PRIVILEGED | Allows an application to call any phone number, including emergency numbers, without going through the Dialer user interface for the user to confirm the call being placed. |
| | PROCESS_OUTGOING_CALLS | Allows an application to monitor, modify, or abort outgoing calls. |
| | READ_SMS | Allows an application to read SMS messages. |
| | RECEIVE_MMS | Allows an application to monitor incoming MMS messages, to record or perform processing on them. |
| | RECEIVE_SMS | Allows an application to monitor incoming SMS messages, to record or perform processing on them. |
| | RECEIVE_WAP_PUSH | Allows an application to monitor incoming WAP push messages. |
| | SEND_SMS | Allows an application to send SMS messages. |
| | WRITE_SMS | Allows an application to write SMS messages. |
| | READ_CALL_LOG | Allows an application to read the user's call log. |
| | READ_SOCIAL_STREAM | Allows an application to read from the user's social stream. |
| | ADD_VOICEMAIL | Allows an application to add voicemails into the operating system (e.g. Android). |
| | USE_SIP | Allows an application to use SIP service |
| | WRITE_CALL_LOG | Allows an application to write (but not read) the user's contacts data. |

A Hosted Application $a_1, a_2, \ldots, a_p$ is a service, whether physically or virtually hosted on the device (e.g. through a remote connection), that can access the resources $r_1, r_2, \ldots, r_n$ of the device D. The list of Hosted Applications of a device D is called Device Application List $A_D$. Given a device D, the Device Application List $A_D$ is defined as the set of applications $a_1, a_2, \ldots, a_p$ hosted on the device [4]:

$$A_D = \left\{ a_1, a_2, \ldots, a_p \;\middle|\; D \xrightarrow{hOST} a \right\}$$

The list of the Resources $r_1, r_2, \ldots, r_n$ (and the associated generated data $d_1, d_2, d_3, \ldots, d_m$) that can be accessed by a Hosted Application $a_1, a_2, \ldots, a_p$ is called Application Report $w(a_i)$. Given a Hosted Application $a_i$ (i=1-p), its Application Report is defined as [5]:

$$w(a_i) = \left\{ r_j \;\middle|\; r_j \in R_D \wedge a_i \xrightarrow{reg} r_j \right\}$$

where reg is the registration function, that is the function applied to every required Resource by a Hosted Application $a_1, a_2, \ldots, a_p$ when the Hosted Application is installed on the user device, or when the installed Hosted Application accesses for the first time the Resource (depending on the architecture of the operating system of the user device 100).

From [5] it can be deduced that a Hosted Application $a_i$ (i=1-p) has access to the Resource Datasets $v(r_i)$ (i=1-n) of all the Resources $r_1, r_2, \ldots, r_n$ in its Application Report $w(a_i)$ [6]:

$$\{d_j | r_k \in w(a_i) \wedge d_j \in v(r_k)\}$$

An assumption is made that at the first access every Hosted Application $a_i$ (i=1-p) explicitly declares the respective Resource Dataset $v(r_i)$ (i=1-n), and this grants to that Hosted Application the access to the listed resources.

Security procedures or technologies for avoiding fraudulent access to the resources of the device can be provided for, but this is not the concern of the present invention.

A Hosted Application $a_1, a_2, \ldots, a_p$, at a generic time t, can be in four different statuses:
  ACTIVE: if the Hosted Application is in execution and in a user-interactive modality;
  RUNNING: if the Hosted Application is in execution (thus can actually access a resource) but not in a user-interactive modality—e.g. in background mode;
  LISTENING: if the Hosted Application is not in execution but is registered as "listener" to some Resources (all or part of those in the Application Report thereof), i.e. the Hosted Application can be activated if any event occurs on the Resource listened to (e.g. when a resource is enabled on the device or generates a data);
  OFF: if the Hosted Application is not in execution and is not registered as "listener" to any Resource.

The measurement method according to an embodiment of the present invention assumes that every Resource in the Device Resource list $R_D$ is associated to a respective Resource Sensitivity Value. The Resource Sensitivity Value enables the discrimination of the Resources $r_1, r_2, \ldots, r_n$ based on the sensitivity of the data $d_1, d_2, d_3, \ldots, d_m$ they generate in terms of privacy, accuracy, etc. This comes from the hypothesis that not all the data have the same importance to the user in different contexts (e.g. the GPS position can tell much more about a user than the accelerometer values).

The Resource Sensitivity value $s(r_i)$ of a Resource $r_i$ is a numeric value in a Sensitivity Scale S [7]:

$$S = (0; s_{max}] \text{ in } R$$

Such that if $s(r_i) > s(r_j)$, Resource $r_i$ generates data that are more sensitive than those generated by Resource $r_j$ according to some parameter, e.g. privacy of the device owner. For example, referring to Table 1, the Resource "ACCESS_FINE_LOCATION" is characterized by a higher value of sensitivity than the Resource "USE_SIP": the access to the real position of the device (and thus of its owner) is more sensitive, from a privacy point of view, than the possibility of enabling the SIP Communication Protocol.

The table below shows a subset of all the available Resources $r_1, r_2, \ldots, r_n$ (column Resource) grouped by classes (column Class) and, for each Resource $r_i$ (i=1-n), an example of the associated Resource Sensitivity value $s(r_i)$:

| Class | Resource $r_{i\,(i\,=\,1\,-\,n)}$ | Resource Sensitivity $s(r_i)$ |
|---|---|---|
| Positioning | ACCESS_CHECKIN_PROPERTIES | 3 |
|  | ACCESS_COARSE_LOCATION | 11 |
|  | ACCESS_FINE_LOCATION | 11 |
|  | ACCESS_LOCATION_EXTRA_COMMANDS | 5 |
|  | CONTROL_LOCATION_UPDATES | 11 |
|  | ACCESS_MOCK_LOCATION | 1 |
| Commuinication | CALL_PHONE | 10 |
|  | CALL_PRIVILEGED | 10 |
|  | PROCESS_OUTGOING_CALLS | 10 |
|  | READ_SMS | 10 |
|  | RECEIVE_MMS | 10 |
|  | RECEIVE_SMS | 10 |
|  | RECEIVE_WAP_PUSH | 3 |
|  | SEND_SMS | 1 |
|  | WRITE_SMS | 1 |
|  | READ_CALL_LOG | 10 |
|  | READ_SOCIAL_STREAM | 10 |
|  | ADD_VOICEMAIL | 1 |
|  | USE_SIP | 1 |

The Sensitivity Scale S can be global or customized at user level, at device level, etc. and is related to the context of the measurement (e.g. privacy, traceability, etc.). In an embodiment of the present invention, $s_{max} = 100$.

Measurement of the Access Level

According to the present invention, the access level to personal data is measured. In particular, the access level to the personal data is measured at the level of the individual hosted applications (access level by hosted application, or application access level), and at the level of the device as a whole (access level by device or device access level).

In an embodiment of the present invention, the access level is measured at three different levels of granularity, hereinafter referred to as:

Personal Data access level by Hosted Application;

Instant Personal Data access level by Device;

Global Personal Data access level by Device.

The Personal Data access level by Hosted Application ranks a Hosted Application $a_i$ (i=1–p) based on the number of the Resources required by the Hosted Application and the Resource Sensitivity value $s(r_i)$ (i=1–n) of such Resources.

Given a Hosted Application $a_i$ (i=1–p) and its Application Report $w(a_i)$ the Personal Data access level $P_A(a_i)$ can be defined as follows [8]:

$$P_A(a_i) = \begin{cases} \log(\prod s(r_k)), \forall r_k \in w(a_i) & \text{if } r_c\neg \in w(a_i) \\ \log(\prod s(r_k)^2), \forall r_k \in w(a_i) & \text{if } r_c \in w(a_i) \end{cases}$$

Where $r_c$ is a communication Resource, i.e. a Resource that enables the connection and the data communication from the device (e.g. the Wi-Fi management resource). A communication resource among those in the Application Report $w(a_i)$ amplifies the accessibility of Personal Data generated by the device D. Thus, in the calculation of the Personal Data access level by Hosted Application for a certain Hosted Application $a_i$, the presence, in the Application Report $w(a_i)$ of that Hosted Application, of a communication Resource $r_c$ can be given more weight by, e.g., squaring the sensitivity values of all the Resources required by the Hosted Application.

The higher the value of the Personal Data Access level $P_A(a_i)$ for a given Hosted Application $a_i$ (i=1–p), the more sensitive is the application.

A Normalized Personal Data access level by Hosted Application is a variant of the measure introduced above, that emphasizes the mean value of sensitivity of all the Resources used by a Hosted Application, giving less influence to the sensitivity values of the more sensitive Resources.

Given the definition [8], the Normalized Personal Data access level by Hosted Application can be calculated as follows [9]:

$$\tilde{P}_A(a_i) = \begin{cases} \dfrac{\prod s(r_k)}{|w(a_i)|}, \forall r_k \in w(a_i) & \text{if } r_c\neg \in w(a_i) \\ \dfrac{\prod s(r_k)^2}{|w(a_i)|}, \forall r_k \in w(a_i) & \text{if } r_c \in w(a_i) \end{cases}$$

where $|w(a_i)|$ denotes the number of Resources in the Application Report $w(a_i)$ of the Hosted Application $a_i$.

The ranking of the Personal Data access level by Hosted Application [8], and the Normalized Personal Data access level by Hosted Application [9] can be evaluated by using a sum instead of a product. In this case it is ([8'] and [9']):

$$P_A(a_i) = \begin{cases} \log(\sum s(r_k)), \forall r_k \in w(a_i) & \text{if } r_c\neg \in w(a_i) \\ \log(\sum s(r_k)^2), \forall r_k \in w(a_i) & \text{if } r_c \in w(a_i) \end{cases}$$

$$\tilde{P}_A(a_i) = \begin{cases} \dfrac{\sum s(r_k)}{|w(a_i)|}, \forall r_k \in w(a_i) & \text{if } r_c\neg \in w(a_i) \\ \dfrac{\sum s(r_k)^2}{|w(a_i)|}, \forall r_k \in w(a_i) & \text{if } r_c \in w(a_i) \end{cases}$$

However, the use of the product emphasizes the contribution of the more sensitive Resources.

Functions [8] and [8'] are still valid if, in place of the function "log", a generic function $f(x)$ is used, such that:

$$f(x) = \begin{cases} x \in R, & f(x) \in R \\ f'(x) > 0 & \forall x \in R \end{cases}$$

The Instant Personal Data access level by Device is a variant of [8] and [9] that takes into account the actual number of times a Hosted Application makes use of a Resource. This variant is applicable to those devices that make accessible the access events count.

Be $t_{l-1}$ and $t_l$ the instants to be considered in the measurement, where $t_l$ is a generic instant, $t_{l-1}$ is the previous instant, and $T_l$ is the Time Window such that [10]:

$$T_l = [t_{l-1}, t_l], t_{l-1} < t_l$$

and let count($a_i, r_k, T_l$) be the number of accesses to a Resource $r_k$ by a Hosted Application $a_i$ in the Time Window $T_l$. The Instant Personal Data access level by Hosted Application at $t_l$ is [11]:

$$\hat{P}_A(a_i, t_l) = \begin{cases} \log(\prod s(r_k) \cdot \text{count}(a_i, r_k, T_l)), \forall r_k \in w(a_i) & \text{if } r_c\neg \in w(a_i) \\ \log(\prod s(r_k)^2 \cdot \text{count}(a_i, r_k, T_l)), \forall r_k \in w(a_i) & \text{if } r_c \in w(a_i) \end{cases}$$

The Instant Personal Data access level by Hosted Application at $t_l$ is "weighted" in the sense that the Resource Sensitivity values in the formulas are multiplied by a coefficient that represents the number of accesses to the data generated by a Resource in the considered Time Window. Thus, the greater is the number of times a Hosted Application accesses the data of a certain Resource, the higher is the weight given at that Resource in the calculation of the Instant Personal Data access level by Hosted Application.

Possibly, the Time Window $T_l$ can also reduce to a time instant, that is $t_{l-1} = t_l$.

The Instant Personal Data access level by Device indicates, at a certain time, the status of access to personal data based on the Hosted Applications that are currently in execution.

For a given device D, having a Device Application List $A_D$, the Instant Personal Data access level by Device $I_D$ in the considered time instant $t_l$ is calculated as [12]:

$$I_D(t_l) = \prod P_A(a_i).$$

$$\forall a_i \in A_D \text{ status}(a_i, t_l) \in \{\text{ACTIVE, RUNNING, LISTENING}\}$$

or [13]:

$$I_D(t_l) = \Pi \check{P}_A(a_i).$$

$$\forall a_i \in A_D \hat{} status(a_i,t_l) \in \{ACTIVE, RUNNING, LISTENING\}$$

or [14]:

$$I_D(t_l) = \Pi \hat{P}_A(a_i,t_l).$$

$$\forall a_i \in A_D \hat{} status(a_i,t_l) \in \{ACTIVE, RUNNING, LISTENING\}$$

depending on the method used for calculating the Personal Data access level by Hosted Application (i.e., depending on whether formula [8] or [9] or [11] is used for calculating the Personal Data access level by Hosted Application), where $t_l$ belongs to $T_l$ as in [10].

The above measurement is calculated based on the Hosted Applications that are in the ACTIVE, RUNNING or LISTENING status, i.e. that can access any of the Resources they have registered to.

The measure of access level to Personal Data by Device can also be global, thus not depending on the instant when it is calculated but related to the whole life of a device D. Given the same assumptions of [12], [13] and [14], the Global Personal Data access level by Device is calculated as [15]:

$$G_D(t_l) = \Pi P_A(a_i), \forall a_i \in A_D$$

or [16]:

$$G_D(t_l) = \Pi \check{P}_A(a_i), \forall a_i \in A_D$$

or [17]:

$$G_D(t_l) = \Pi \hat{P}_A(a_i,t_l), \forall a_i \in A_D$$

depending on the method used for calculating the Personal Data access level by Hosted Application. In [17] the considered Time Window $T_l$ coincides with the entire life of the Device.

In case the resulting value of the Global Personal Data access level by Device be very high, it is possible to express this value in decibels:

$$I'_D(t_l) = 10 * \log(I_D(t_l))$$

The Global Personal Data access level by Device is a more general measurement that gives an indication on the status of the Device D.

The Device Application Ranking is an ordered list indicating the relationship among the Hosted Applications of a Device D based on their measured Personal Data access level.

Given a device D and its Device Application List DA, the Device Application Ranking $D_R$ is defined as [18]:

$$D_R = a_1, a_2, \ldots, a_n, \forall a \in A_D | P_A(a_1) > P_A(a_2) > \ldots > P_A(a_n)$$

The calculated Device Application Ranking can be used to show to the mobile phone users the hosted application on the device ordered by their associated Personal Data access level by Hosted Application (as described later on).

Monitoring

It is possible to monitor how the Global Personal Data access level by Device and the Instant Personal Data access level by Device measurements change over time when a Hosted Application Event happens.

A Hosted Application Event is an event that modifies the Device Application List that is in a given state. The measured Global Personal Data access level by Device and/or the Instant Personal Data access level by Device will change accordingly.

There are five possible Hosted Application Events:
INSERT
DELETE
UPDATE
START
STOP The INSERT event happens when a new Hosted Application with status OFF is added to the Device Application List.

Accordingly, the Instant Personal Data access level by Device measurement will not change but the Global Personal Data access level by Device measurement may increase.

Given the same assumptions of [12], [13] and [14], being $t_e$ the instant in which the event INSERT related to a Hosted Application a occurs and given an instant t' such that $t' < t_e$, it is:

$$\begin{cases} I_D(t_e) = I_D(t') \\ G_D(t_e) = G_D(t') * \Delta G_D(a) \end{cases}$$

where $\Delta G_D(a) > 0$ depends on the method used for calculating the Personal Data access level by Hosted Application:

$$\Delta G_D(a) = \begin{cases} P_A(a) & \text{formula (15)} \\ \check{P}_A(a_i) & \text{formula (16)} \\ \hat{P}_A(a, t_e) & \text{formula (17)} \end{cases}$$

The DELETE event happens when a new Hosted Application with status OFF is deleted from the Device Application List.

Accordingly, the Instant Personal Data access level by Device measurement will not change but the Global Personal Data access level by Device measurement may decrease.

Given the same assumptions of [12], [13] and [14], being $t_e$ the instant in which the event DELETED related to a Hosted Application a occurs and given an instant t' such that $t' < t_e$, it is:

$$\begin{cases} I_D(t_e) = I_D(t') \\ G_D(t_e) = \dfrac{G_D(t')}{\Delta G_D(a)} \end{cases}$$

where $\Delta G_D(a) > 0$ depends on the method used for calculating the Personal Data access level by Hosted Application:

$$\Delta G_D(a) = \begin{cases} P_A(a) & \text{formula (15)} \\ \check{P}_A(a_i) & \text{formula (16)} \\ \hat{P}_A(a, t_e) & \text{formula (17)} \end{cases}$$

The UPDATE event happens when one of the Hosted Applications in the Device Application List changes in a way that the Resources $r_1, r_2, \ldots, r_n$ it uses change.

Accordingly, the Global Personal Data access level by Device measurement will change; the Instant Personal Data access level by Device measurement will change only if the application update is not in the OFF status when the event occurs.

Given the same assumptions of [12], [13] and [14], being $t_e$ the instant in which the UPDATE event related to a Hosted Application a occurs and given an instant t' such that t'<$t_e$, it is:

$$\begin{cases} I_D(t_e) = I_D(t') & \text{if } a \text{ is in OFF status at } t_e \\ I_D(t_e) = I_D(t') * \Delta P(a) & \text{if } a \text{ is not in OFF status at } t_e \\ G_D(t'') = G_D(t') * \Delta P(a) \end{cases}$$

where $\Delta P(a)$ depends on the method used for calculating the Personal Data Access Level by Hosted Application. $\Delta P(a)$ is greater or lower than zero depending on the new set of Resources the application a accesses being more or less sensitive than the old one.

The START event happens when one of the Hosted Applications in the Device Application List changes its status from OFF to one of the other three statuses (ACTIVE, RUNNING, LISTENING). Accordingly, the Global Personal Data access level by Device measurement will not change while the Instant Personal Data access level by Device measurement will change.

Given the same assumptions of [12], [13] and [14], being $t_e$ the instant in which the START event related to a Hosted Application a occurs and given an instant t' such that t'<$t_e$, it is:

$$\begin{cases} G_D(t_e) = G_D(t') \\ I_D(t_e) = I_D(t') * \Delta I_D(a) \end{cases}$$

where $\Delta I_D(a)>0$ depends on the method used for calculating the Personal Data Access Level by Hosted Application:

$$\Delta I_D(a) = \begin{cases} P_A(a) & \text{formula (15)} \\ \tilde{P}_A(a_i) & \text{formula (16)} \\ \hat{P}_A(a, t_e) & \text{formula (17)} \end{cases}$$

The STOP event happens when one of the Hosted Applications in the Device Application List changes its status from one of the three statuses ACTIVE, RUNNING OR LISTENING to the status OFF. Accordingly, the Global Personal Data access level by Device measurement will not change while the Instant Personal Data access level by Device measurement will decrease.

Given the same assumptions of [12], [13] and [14], being $t_e$ the instant in which the STOP event related to a Hosted Application a occurs and given an instant t' such that t'<$t_e$, it is:

$$\begin{cases} G_D(t_e) = G_D(t') \\ I_D(t_e) = \dfrac{I_D(t')}{\Delta I_D(a)} \end{cases}$$

where $\Delta I_D(a)>0$ depends on the method used for calculating the Personal Data Access Level by Hosted Application:

$$\Delta I_D(a) = \begin{cases} P_A(a) & \text{formula (15)} \\ \tilde{P}_A(a_i) & \text{formula (16)} \\ \hat{P}_A(a, t_e) & \text{formula (17)} \end{cases}$$

Figure 2:
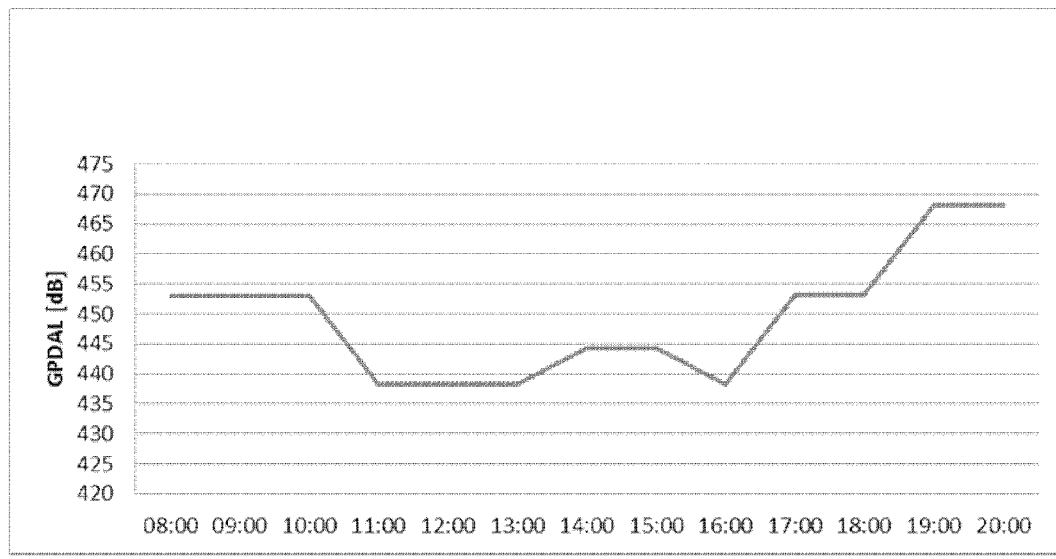
FIG. 2 is a diagram showing a possible trend in time of the amount of accessed data, generated by resources of the user device, accessed by applications hosted on the user device of FIG. 1.

The chart in FIG. 2 shows an example of Global Personal Data access level by Device ($I_D$, denoted GPDAL in the drawing) vs Time, calculated as in [15] when a user makes an action over the applications hosted on his/her Device D, in particular when the number of Hosted Applications accessing the Resources of his/her Device changes. The values of $I_D$ are calculated by [15] and are expressed in dB.

The trend of the function GPDAL is explained by the following exemplary events:
- at t=10:00, the user uninstalls an application which uses a communication resource (event DELETE);
- at t=13:00, the user installs an application which does not use a communication resource (event INSERT);
- at t=15:00, the user uninstalls an application which does not use a communication resource (event DELETE);
- at t=17:00, the user installs an application which uses a communication resource (event INSERT);
- at t=18:00, the user uninstalls an application which uses a communication resource (event DELETE).

Experimental Work

The method of the present invention has been included in an Android application, called "Privacy Owl".

Such an application gives to the user an indication of the amount of data shared with the providers of the applications installed on his/her smartphone or tablet.

Figures 3, 4, 5:
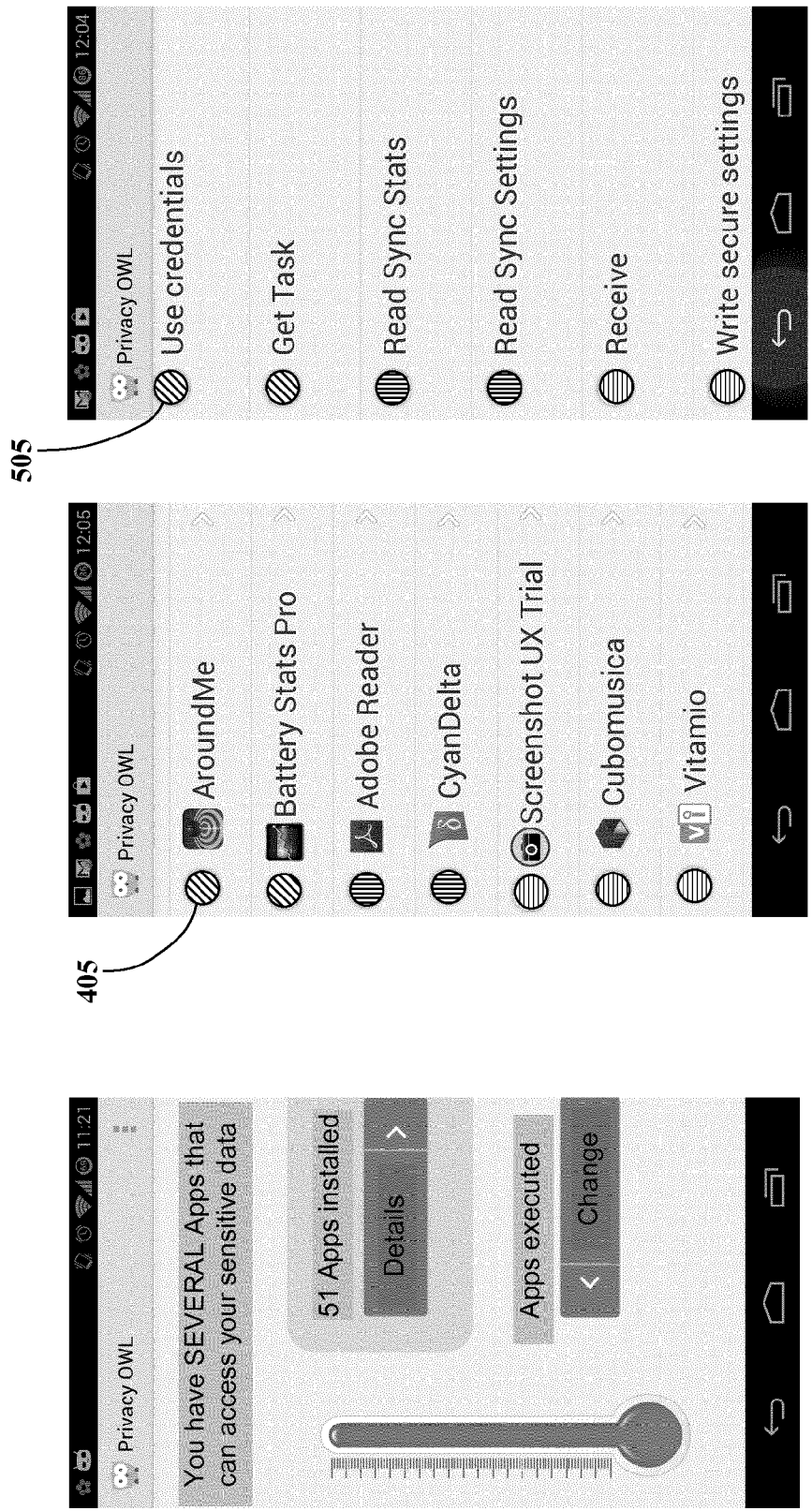
FIGS. 3, 4 and 5 are exemplary screenshots of a device display when executing an application including the method of the present invention.

FIG. 3, FIG. 4 and FIG. 5 show some screenshots of the display 110 of the user device when the Privacy Owl application is being executed.

FIG. 3 shows the screenshot of the display of the home page of the Privacy Owl application; it shows how many applications are installed on the user device and a thermometer is correlated to the calculated value of the Global Personal Data access by Device level calculated by formula [15].

By selecting "Change", the user can switch the Privacy Owl application between ACTIVE mode and RUNNING mode.

By selecting "Details", the user can see the application list. Each application $A_i$ has its own logo and an associated icon that (assuming that the user device has a color display 110) can be red, yellow or green; in FIG. 4 the icon 405 associated with each application is represented as a circle, and the color red is represented by slanted lines, the color yellow is represented by vertical lines, the color green is represented by horizontal lines. The color of the icon associated with a certain application is correlated to the Personal Data Access level by Application $P_A(A_i)$ for that application $A_i$ calculated by formula [8]. The list of the displayed applications can take into account the calculated Device Application Ranking.

If $P_A(A_i)$ is the Personal Data Access level by Hosted Application for application Ai, two thresholds $p_1$ and $p_2$ are set, with $p_1<p_2$: the color is assigned to an application $A_i$ by the following formula:

$$\begin{cases} \text{red} & \text{if } P_A(A_i) > p_2 \\ \text{yellow} & \text{if } p_1 \leq P_A(A_i) \leq p_2 \\ \text{green} & \text{if } P_A(A_i) < p_1 \end{cases}$$

By selecting an application, the user can check which data the application can access (FIG. 5), according to its Application Report.

Each Resource in the Application Report has an associated icon 505 that can be red, yellow or green. In FIG. 5, the icon 505 associated with each application is represented as a circle, and the color red is represented by slanted lines, the color yellow is represented by vertical lines, the color green is represented by horizontal lines The color is correlated to the Resource Sensitivity Value for that resource; the higher is the Resource Sensitivity Value the darker is the color.

§§§§§

The present invention can be helpful to make users aware of the quantity and quality of data stored on his/her personal devices and shared by the applications installed and used. The measurements introduced as described in the foregoing, expressed by simple indicators, provide an easy-to-understand way for accessing these information.

The present invention has several practical uses.

For example, the present invention can be used to conduct a study to evaluate the modifications to the user's behavior due to such an awareness, making him/her available to monitor the personal data generated by the resources of their device.

The study can be structured as follows:
1. the user is asked to answer to a survey to investigate his/her awareness about the privacy issues related to the use of the application of a device;
2. in a defined time period, e.g. one month, the usage patterns, in terms of time, frequency, etc., of the applications installed on the user device is tracked;
3. providing the user with the indicators introduced by the invention (Global and the Instant Personal Data access levels), the usage patterns, in terms of time, frequency, etc., of the applications installed on the user device is tracked again. In this period the user is prompted with what data are used by each application and how many data they are sharing due to a certain application;
4. the survey at step 1 is repeated.

From the behavioral change perspective, this study makes it possible to track, while the user is provided with the indicators about the quantity and quality of Personal Data used by a certain application, if:
the application is less used;
the application is no longer used;
the application is uninstalled.

This information can be useful to managers of applications stores and also applications developers, to decide whether to continue or not proposing an application to the users, or to redesign it.

The solution according to the present invention can be advantageously used in systems for sharing and exchanging users' personal data, in which a TLC operator has a role of guaranteeing and certifying the exchanged data, and the proper exchange of the data with third parties.

The invention claimed is:

1. A method of measuring and monitoring usage of data stored on a user device, the method comprising:

determining, by the user device, sensitivity of data generated by a plurality of resources of the user device;
for each resource of the plurality of resources, determining, by the user device and based on the sensitivity of the data generated by the resource, a resource sensitivity value in a predetermined sensitivity scale, wherein the resource sensitivity values of the plurality of resources is adapted to enable discrimination among the plurality of resources;
determining a plurality of operating states in which one or more of a plurality of applications installed on the user device can operate;
for each application of the plurality of applications installed on the user device, calculating an application access level to the data by combining, through a first predetermined function, the resource sensitivity values of the plurality of resources that generated the data accessed by the application, wherein the calculating the application access level is performed in response to a determination that an application of the plurality of applications changes from an operating state of the plurality of operating states to another operating state of the plurality of operating states;
calculating a device access level to the data by the plurality of applications, wherein the device access level is calculated by combining, through a second predetermined function, the calculated application access levels of the plurality of applications installed on the user device;
associating, with each application of the plurality of applications, an indication of the calculated application access level;
for each application of the plurality of applications, displaying, on a display of the user device, the indication of the calculated application access level; and
displaying, on the display of the user device, an indication of the calculated device access level to the data by the plurality of applications.

2. The method of claim 1, further comprising:
for each application, comparing the respective calculated application access level with a first threshold value, and
for each application, presenting on the display of the user device a first indication if the respective calculated application access level is below the first threshold value, or a second indication if the respective calculated application access level is not below the first threshold value.

3. The method of claim 2, further comprising:
for each application, comparing the respective calculated application access level with a second threshold value, higher than the first threshold value, and
for each application, presenting on the display of the user device the second indication if the respective calculated application access level is below the second threshold value, or a third indication if the respective calculated application access level is not below the second threshold value.

4. The method of claim 1, further comprising:
repeating the following steps whenever any application of the plurality of applications changes from an operating state of the plurality of operating states to another operating state of the plurality of operating states, or vice versa:
the determining the resource sensitivity value,
the calculating the application access level,
the calculating the device access level, and the associating the indication of the calculated application access level.

5. The method of claim 4, wherein the plurality of operating states comprise:
   a first operating state in which an application executes on the user device and in a user-interactive mode;
   a second operating state in which an application executes on the user device but not in the user-interactive mode;
   a third operating state in which an application is not executing on the user device but is listening to at least one of the resources and can be activated when an event related to the at least one of the resources occurs; and
   a fourth operating state in which an application is not executing and is not listening to any of the resources.

6. The method of claim 1, wherein the calculating the application access level for each application comprises applying more weight, in the combining, to the sensitivity values of those resources that enable connection and data communication from the user device to an external data network.

7. The method of claim 6, wherein the applying more weight comprises squaring the sensitivity values of those resources that enable the connection and the data communication from the user device to the external data network.

8. The method of claim 1, wherein the first predetermined function comprises one of: a product of the sensitivity values of the resources that generate data accessed by the application and a sum of the sensitivity values of the resources that generate data accessed by the application.

9. The method of claim 1, wherein the second predetermined function comprises a product of the calculated application access levels of the applications installed on the user device.

10. The method of claim 1, wherein the determining the resource sensitivity value, the calculating the application access level, the calculating the device access level, and the associating the indication of the calculated application access level are each performed in response to a determination that an application of the plurality of applications changes from an operating state of the plurality of operating states to another operating state of the plurality of operating states.

11. A non-transitory computer readable medium having a computer program comprising computer program code portions stored thereon, the computer program, when the computer program is executed on a data processing device, performing a method of measuring and monitoring usage of data stored on a user device, the method comprising:
   determining, by the user device, sensitivity of data generated by a plurality of resources of the user device;
   for each resource of the plurality of resources, determining, by the user device and based on the sensitivity of the data generated by the resource, a resource sensitivity value in a predetermined sensitivity scale, wherein the resource sensitivity values of the plurality of resources is adapted to enable discrimination among the plurality of resources;
   determining a plurality of operating states in which one or more of a plurality of applications installed on the user device can operate;
   for each application of the plurality of applications installed on the user device, calculating an application access level to the data by combining, through a first predetermined function, the resource sensitivity values of the plurality of resources that generated the data accessed by the application, wherein the calculating the application access level is performed in response to a determination that an application of the plurality of applications changes from an operating state of the plurality of operating states to another operating state of the plurality of operating states;
   calculating a device access level to the data by the plurality of applications, wherein the device access level is calculated by combining, through a second predetermined function, the calculated application access levels of the plurality of applications installed on the user device;
   associating, with each application of the plurality of applications, an indication of the calculated application access level;
   for each application of the plurality of applications, displaying, on a display of the user device, the indication of the calculated application access level; and
   displaying, on the display of the user device, an indication of the calculated device access level to the data by the plurality of applications.

12. The non-transitory computer readable medium of claim 11, wherein the determining the resource sensitivity value, the calculating the application access level, the calculating the device access level, and the associating the indication of the calculated application access level are each performed in response to a determination that an application of the plurality of applications changes from an operating state of the plurality of operating states to another operating state of the plurality of operating states.

13. The non-transitory computer readable medium of claim 11, wherein the calculating the application access level for each application comprises applying more weight, in the combining, to the sensitivity values of those resources that enable connection and data communication from the user device to an external data network.

14. The non-transitory computer readable medium of claim 13, wherein the applying more weight comprises squaring the sensitivity values of those resources that enable the connection and the data communication from the user device to the external data network.

15. The non-transitory computer readable medium of claim 11, wherein the first predetermined function comprises one of: a product of the sensitivity values of the resources that generate data accessed by the application and a sum of the sensitivity values of the resources that generate data accessed by the application.

16. A user device comprising:
   a processing unit;
   a display;
   a plurality of resources configured to generate data;
   a plurality of hosted applications configured to access the plurality of resources; and
   a non-transitory computer readable medium having stored thereon a computer program that, when executed on the processing unit, performs a method of measuring and monitoring usage of stored data, the method comprising:
   determining sensitivity of data generated by the plurality of resources of the user device;
   for each resource of the plurality of resources, determining, based on the sensitivity of the data generated by the resource, a resource sensitivity value in a predetermined sensitivity scale, wherein the resource sensitivity values of the plurality of resources is adapted to enable discrimination among the plurality of resources;
   determining a plurality of operating states in which one or more of the plurality of hosted applications installed on the user device can operate;

for each application of the plurality of hosted applications installed on the user device, calculating an application access level to the data by combining, through a first predetermined function, the resource sensitivity values of the plurality of resources that generated the data accessed by the application, wherein the calculating the application access level is performed in response to a determination that an application of the plurality of hosted applications changes from an operating state of the plurality of operating states to another operating state of the plurality of operating states;

calculating a device access level to the data by the plurality of hosted applications, wherein the device access level is calculated by combining, through a second predetermined function, the calculated application access levels of the plurality of hosted applications installed on the user device;

associating, with each application of the plurality of hosted applications, an indication of the calculated application access level;

for each application of the plurality of hosted applications, displaying, on the display of the user device, the indication of the calculated application access level; and displaying, on the display of the user device, an indication of the calculated device access level to the data by the plurality of hosted applications.

17. The user device of claim 16, wherein the determining the resource sensitivity value, the calculating the application access level, the calculating the device access level, and the associating the indication of the calculated application access level are each performed in response to a determination that an application of the plurality of hosted applications changes from an operating state of the plurality of operating states to another operating state of the plurality of operating states.

18. The user device of claim 16, wherein the calculating the application access level for each application comprises applying more weight, in the combining, to the sensitivity values of those resources that enable connection and data communication from the user device to an external data network.

19. The user device of claim 18, wherein the applying more weight comprises squaring the sensitivity values of those resources that enable the connection and the data communication from the user device to the external data network.

20. The user device of claim 16, wherein the first predetermined function comprises one of: a product of the sensitivity values of the resources that generate data accessed by the application and a sum of the sensitivity values of the resources that generate data accessed by the application.

\* \* \* \* \*